United States Patent
Ziegler et al.

(10) Patent No.: US 6,736,248 B2
(45) Date of Patent: May 18, 2004

(54) TRANSPORT-SECURING ARRANGEMENT FOR A PRESSURE PLATE ASSEMBLY OF A MULTI-DISK CLUTCH

(75) Inventors: Erwin Ziegler, Gressthal (DE); Reinhold Weidinger, Unterspiesheim (DE); Frank Hirschmann, Niederwerrn (DE); Klaus Steinel, Bergrheinfeld (DE); Wolfram Hick, Schwanfeld (DE); Norbert Lohaus, Schweinfurt (DE); Joachim Lindner, Dittelbrunn (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/261,786

(22) Filed: Oct. 1, 2002

(65) Prior Publication Data
US 2003/0062238 A1 Apr. 3, 2003

(30) Foreign Application Priority Data

Oct. 1, 2001 (DE) .......................................... 101 48 431
May 8, 2002 (DE) .......................................... 102 20 418

(51) Int. Cl.⁷ .............................................. F16D 13/71
(52) U.S. Cl. ............................... 192/70.13; 192/70.27; 192/109 R
(58) Field of Search ........................... 192/70.13, 70.27, 192/89.24, 109 R

(56) References Cited

U.S. PATENT DOCUMENTS

| | | | | |
|---|---|---|---|---|
| 4,605,114 A | * | 8/1986 | Goetz et al. | 192/213.1 |
| 4,697,685 A | * | 10/1987 | Bancroft | 192/109 R |
| 4,809,834 A | * | 3/1989 | Channing | 192/70.27 |
| 4,883,153 A | * | 11/1989 | Maucher et al. | 192/70.27 |
| 5,127,499 A | * | 7/1992 | Beccaris et al. | 192/70.27 |

* cited by examiner

Primary Examiner—Richard M. Lorence
(74) Attorney, Agent, or Firm—Cohen, Pontani, Lieberman & Pavane

(57) ABSTRACT

A transport-securing arrangement for a pressure plate assembly of a multi-disk clutch including a housing arrangement connectable to a flywheel, a pressure plate coupled to the housing arrangement for common rotation therewith, a stored-energy device having one side supported on the housing arrangement and another side supported on the pressure plate arrangement. The pressure plate assembly also includes an intermediate plate connected to the housing arrangement for common rotation therewith and a first clutch disk with a friction surface area positioned between the pressure plate and the intermediate plate. The transport-securing arrangement comprises a plurality of connecting elements, preferably bolt elements, for tightly connecting the intermediate plate to the housing arrangement.

16 Claims, 4 Drawing Sheets

TRANSPORT-SECURING ARRANGEMENT FOR A PRESSURE PLATE ASSEMBLY OF A MULTI-DISK CLUTCH

BACKGROUND OF THE INVENTION

1. Field of the Invention

The present invention relates to a transport-securing arrangement for a pressure plate assembly of a multi-disk clutch in which the pressure plate assembly includes a housing arrangement designed to be connected to a flywheel arrangement, a pressure plate arrangement coupled to the housing arrangement for rotation in common therewith, a stored-energy device supported by the housing arrangement on one side and by the pressure plate arrangement on the other, an intermediate plate connected to the housing arrangement for rotation in common therewith, and a first clutch disk having a friction surface area positioned between the pressure plate and the intermediate plate.

2. Description of the Related Art

Before a pressure plate assembly has been attached to a flywheel arrangement and thus before there is any "force feedback" acting in opposition to the force being exerted by the stored-energy device, the stored-energy device pushes the pressure plate and thus also the components cooperating with it away from the housing arrangement. This force has the effect of also imposing relatively severe loads on the elements such as the tangential leaf springs which nonrotatably connect the pressure plate and possibly the intermediate plate as well to the housing arrangement.

When a wear-compensating device is provided in the area of this type of pressure plate assembly, an additional problem is that the wear-compensating device may execute undesirable adjusting movements when there is no force acting in opposition to the action of the stored-energy device.

SUMMARY OF THE INVENTION

An object of the present invention is to provide a transport-securing arrangement for a pressure plate assembly of a multi-disk clutch which avoids in a simple and reliable manner the imposition of excessive loads on the various components while they are in the ready-for-transport condition and to prevent unwanted adjusting movements where a wear-compensating compensating device is provided.

According to the present invention, the object is achieved by a transport-securing arrangement for the pressure plate assembly of a multi-disk clutch, where the pressure plate assembly includes a housing arrangement designed to be connected to a flywheel arrangement, a pressure plate arrangement coupled to the housing arrangement for rotation therewith, a stored-energy device having one side supported by the housing arrangement and another side supported by the pressure plate arrangement, an intermediate plate connected to the housing arrangement for rotation therewith, and a first clutch disk having a friction surface area positioned between the pressure plate and the intermediate plate. The transport-securing arrangement includes a plurality of connecting elements, preferably bolt elements, for tightly connecting the intermediate plate to the housing arrangement.

The tight connection of the housing arrangement to the intermediate plate eliminates the freedom of axial movement of the intermediate plate with respect to the housing arrangement, which freedom is present during operation of the clutch. Accordingly, the connection creates an opposing support element for the pressure plate and for the first clutch disk upon which the pressure plate acts. This opposing support element takes over the force feedback function which is normally fulfilled by the flywheel arrangement in a completely assembled multi-disk clutch. When this type of pressure plate assembly is equipped with a wear-compensating device, the transport securing arrangement prevents the occurrence of undesirable adjusting movements before attachment of the pressure plate assembly to the flywheel arrangement.

So that a uniform retaining action is obtained, the connecting elements may be positioned in an outer circumferential area of the housing arrangement and distributed in the circumferential direction.

The process of attaching a pressure plate assembly equipped with the transport-securing securing device according to the present invention to a flywheel arrangement may be effected in an especially simple way if it is ensured that the connecting elements allow the pressure plate assembly to be positioned on and attached to the flywheel arrangement while the various components are still in the secured-for-transport state.

When a transport-securing arrangement according to the present invention is provided, it is still important minimize costs, despite the advantages it may offer. To accomplish this goal, at least some of the connecting elements of the transport-securing arrangement may also be used as fastening bolts for attaching the housing arrangement to the flywheel arrangement, for example, when the pressure plate assembly is to be connected to the flywheel arrangement.

Because the fastening bolts used to fasten the pressure plate assembly to the flywheel arrangement must have a certain minimum length, which is usually longer than would be necessary for the transport-securing function according to the present invention, the connecting element which may, for example, be bolt elements extending through openings in the housing arrangement with externally threaded sections screwed into internally threaded openings in the intermediate plate and that the bolt elements are supported on the housing arrangement by spacers. For example, the spacers may comprise sleeves on which the heads of the bolt elements rest.

To further simplify the assembly of a friction clutch by limiting as far as possible the number of different assemblies which must be handled during the assembly process, the pressure plate assembly may also comprise a second clutch disk with a friction surface area in a position following the intermediate plate, wherein the second clutch disk is connected to the first clutch disk by a common hub. The use of a common hub ensures that the second clutch disk, for which no opposing support element would otherwise be present before the flywheel arrangement is attached, is also held in a defined manner on the pressure plate assembly.

The first clutch disk and the second clutch disk may be configured with internal teeth which engage with a configuration of external teeth on the hub so that the two clutch disks may be connected nonrotatably by the common hub to a power takeoff shaft.

Motion stops for the first and second clutch disks may also be provided on the hub, one motion stop at each of the two axial ends of the hub.

Because the second clutch disk along with the common hub cannot be attached until after the first clutch disk and the intermediate plate have been connected to the housing arrangement, the motion stop cooperating with the first clutch disk may comprise a latching element as a way of realizing the connecting function to be provided by the common hub. The latching element arrives in a stopping position after the hub with its configuration of external teeth has been introduced into the configuration of internal teeth of the first clutch disk. For example, the latching element may comprise a latching ring pretensioned in the radially outward direction.

To obtain a tight connection between the second clutch disk and the hub, which is advantageous especially for the sake of avoiding rattling noises during the operation of the friction clutch, a pretensioning element may be provided in the area of the motion stop cooperating with the second clutch disk to pretension the second clutch disk so that the second clutch disk remains in contact with an opposing support area of the hub. For example, the opposing support area may be formed by a radial shoulder of the configuration of external teeth on the common hub.

The friction surface area of the first clutch disk is held between the pressure plate and the intermediate plate after the secured-for-transport state has been produced.

The present invention also relates to a clutch disk assembly for a multi-disk clutch including at least two clutch disks arranged in succession, each clutch disk having a friction surface in its radially outer area, an intermediate plate between the friction surface areas of the minimum of two clutch disks, and a hub on which the minimum of two clutch disks are held in essentially nonrotatable fashion. At least one motion stop is arranged on the hub for each of the clutch disks for limiting the relative motion between these clutch disks and the hub in at least one axial direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
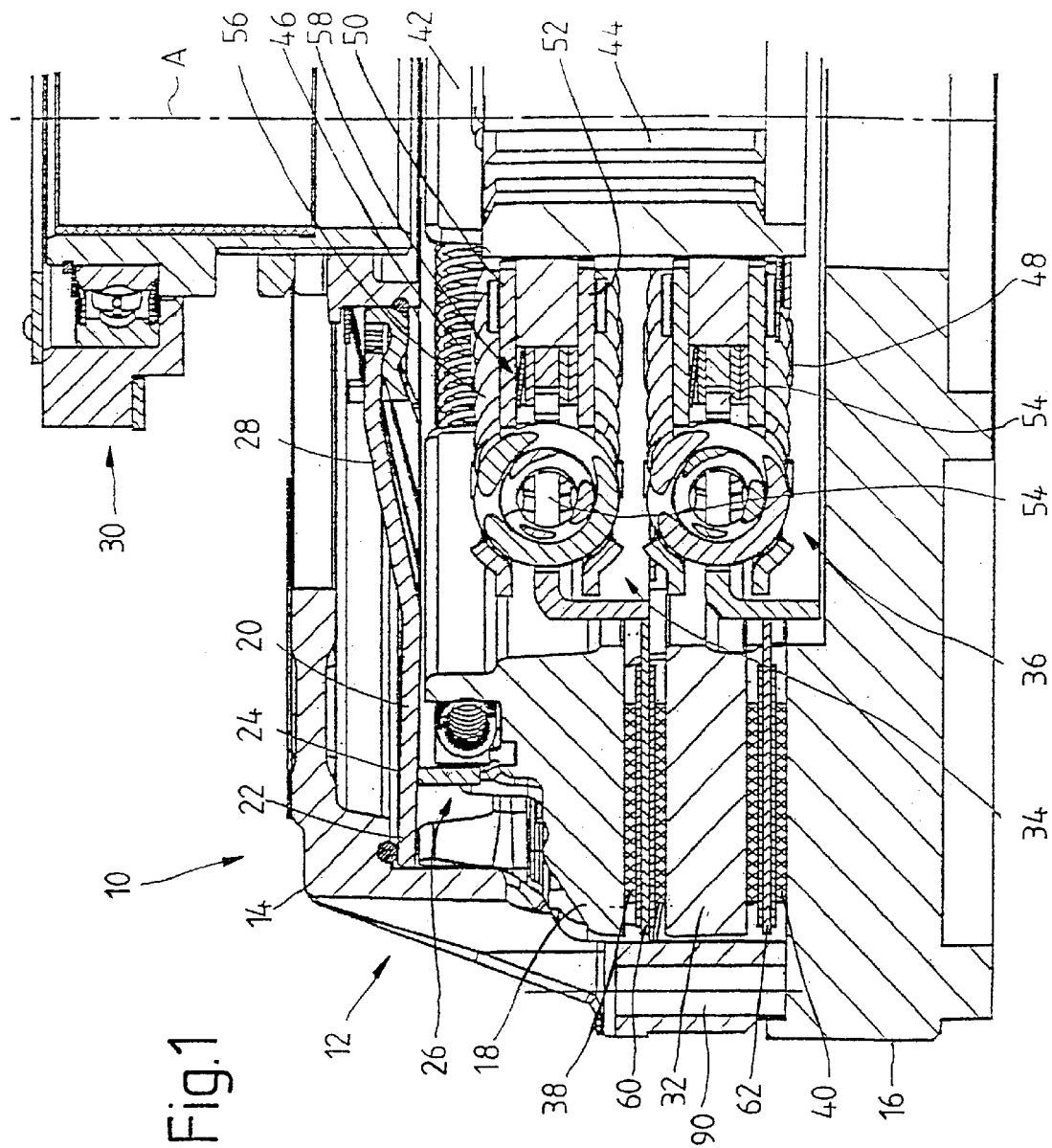
FIG. 1 is a partial longitudinal sectional view through a friction clutch in which an embodiment of the present invention may be implemented.

FIGS. 1–4 show an embodiment of a friction clutch 10 in which the present invention may be implemented. The friction clutch 10 comprises a pressure plate assembly 12 with a housing 14, the radially outer area of which is connected to or connectable to a flywheel 16. The flywheel 16 may be designed as single mass or a multi-mass flywheel. The radially inner area of the flywheel 16 is designed so that it is nonrotatably connectable to a drive shaft, such as a crankshaft of an internal combustion engine.

The pressure plate assembly 12 also includes a pressure plate 18, which is essentially nonrotatably connected to the housing 14 such as, for example, by a plurality of tangential leaf springs but is axially movable with respect to the housing 14 within a limited axial range in the direction of an axis of rotation A. The radially outer area 22 of a stored-energy device 20 such as, for example, as a diaphragm spring is supported on the housing 14. An area 24 of the stored energy device located farther inward in the radial direction acts on the pressure plate 18 through a wear-compensating device 26, which is described in greater detail further below. A release mechanism 30 for executing pull-type disengaging processes acts on spring tongues 28 located radially on the inside of the stored-energy device 20.

The pressure plate assembly 12 also includes an intermediate plate 32. The housing 14 is also connected to the intermediate plate 32 such that the intermediate plate is fixed with respect to rotation relative to the housing and is free to move within a certain axial range.

The pressure plate assembly 12 of the friction clutch 10 further includes two clutch disks 34, 36. Each of these clutch disks 34, 36 has a friction lining 38, 40 in the radially outer area. A hub 42 is connected to the radially inner area of the clutch disks 34, 36. The hub 42 includes wedge-like teeth 44 which are nonrotatably connectable on a power takeoff shaft, such as a transmission input shaft.

Each of the two clutch disks 34, 36 also has a torsional vibration damping arrangement 46, 48. The two torsional vibration damping arrangements 46, 48 are similarly designed in the embodiment presented here and only the torsional vibration damping arrangement 46 of the clutch disk 34 will be described in the following. The torsional vibration damping arrangement 46 includes two cover disk elements 50, 52, the radially inner areas of which are connected to the hub 42 for rotation in common therewith, either directly or via an additional predamper stage. The two cover disk elements 50, 52 may, for example, have internal teeth which mesh with corresponding external teeth on the hub 42. Axially between the two cover disk elements 50, 52 is a central disk element 54. Both the cover disk elements 50, 52 and the central disk element 54 have spring windows with control edges in the circumferential direction, on each of which the end of a damper spring 56 is supported in the circumferential direction. Several damper springs 56 in a row in the circumferential direction or groups of damper springs 56 nested radially inside each other may be provided as is generally known in and of itself for torsional vibration damper arrangements normally provided for clutch disks. The damper springs 56 allow a limited circumferential mobility of the central disk element 54 with respect to the associated cover disk elements 50, 52. A stop for limiting rotational movement may be provided to prevent the damper springs 56 from being fully compressed. In addition, a dry friction device 58 may also be provided to contribute by Coulomb friction to the vibration damping above and beyond the damping effect provided by compression of the springs. As mentioned above, the torsional vibration damping arrangements 46, 48 may be designed with several stages such as, for example, by providing an additional set of cover disk elements axially farther toward the outside and an associated set of springs which act between the cover disk elements 50, 52 and the additional cover disk elements.

The radially outer area of each of the central disk elements 54 of the two clutch disks 34, 36 carry disk-like friction lining carriers 60, 62 which carry the friction linings 38, 40 via associated leaf springs. Alternatively, the friction lining carriers 60, 62 may themselves be the spring linings.

In the engaged state, the stored-energy device 20 presses down via the previously mentioned wear-compensating device 26 on the pressure plate 18. This presses the friction linings 38 of the clutch disk 34 against the intermediate plate 32. The clutch disk 36 with its friction linings 40 may then be clamped between the intermediate plate 32 and the flywheel 16. As a result of this friction-locking connection, a nonrotatable connection is established between a first side of the clutch comprising the pressure plate 18, the intermediate plate 32, and the flywheel 16 and a second side of the clutch comprising the two clutch disks 34, 36 on the common hub 42. For the transition to the disengaged state, a pulling force is exerted on the spring tongues 28 of the stored-energy device 20. This moves area 24 of the stored-energy device 20 axially away from the flywheel 16, thereby releasing at least some the force exerted by the stored-energy device 20 from the pressure plate 18. Under the action of the previously mentioned tangential leaf springs, the pressure plate 18 and the intermediate plate 32 are then also moved axially away from the flywheel 16 to release the clamping action and the two clutch disks 34, 36.

Figure 2:
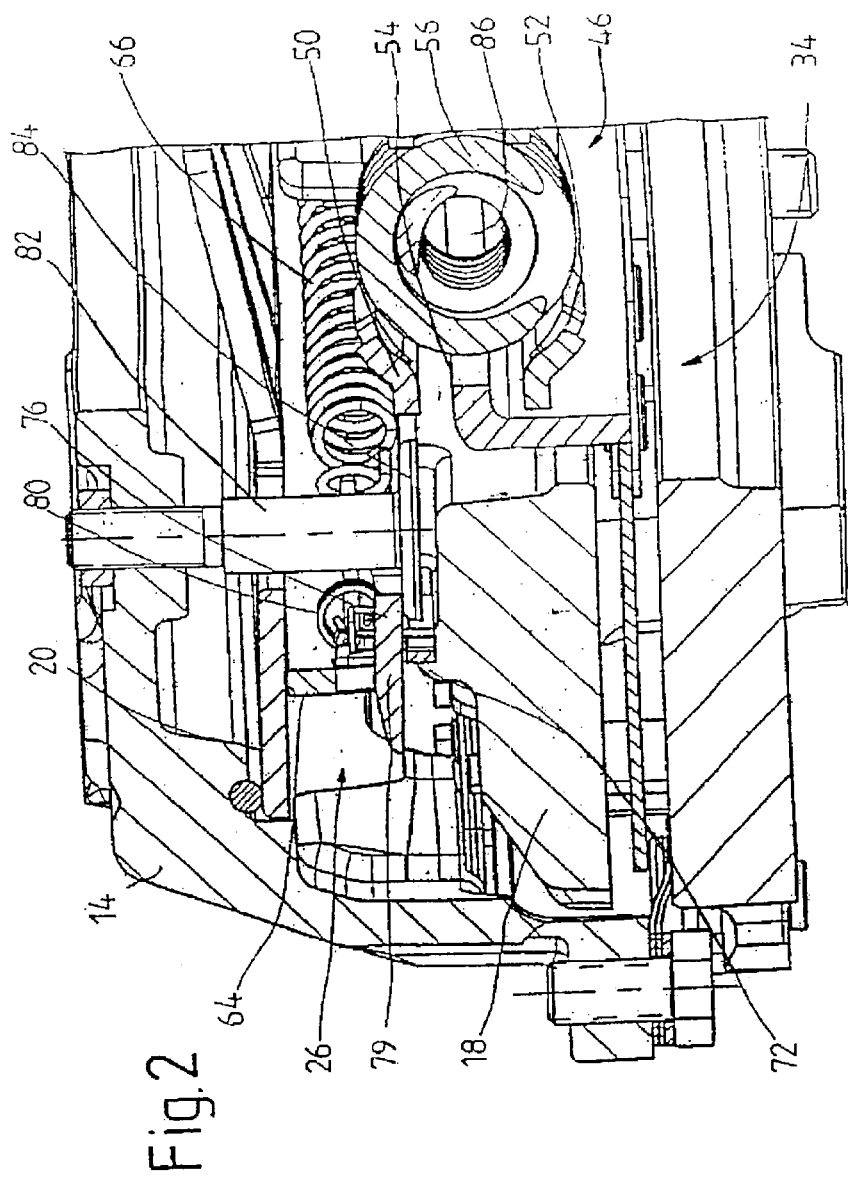
FIG. 2 is a partial longitudinal sectional view through a pressure plate assembly with a clutch disk and an intermediate plate of the friction clutch of FIG. 1.
Figure 3:
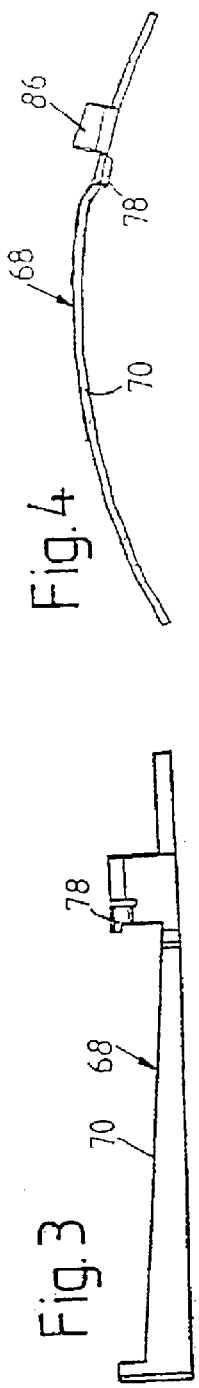
FIG. 3 is a side view of a wedge-like slider provided for the pressure plate assembly of FIG. 2.

In the following, the design and function of the wear-compensating device 26 is described with reference to FIGS. 2–4.

The wear-compensating device 26 comprises an adjusting 64 ring. The stored-energy device 20 acts on one axial side of the adjusting ring 64. The other axial side of the adjusting ring 64 has several inclined ramp or wedge surfaces arranged in succession in the circumferential direction such that the height of these ramps changes in the circumferential direction. Axially opposing these surfaces are corresponding surfaces of the pressure plate 18. A rotation of the adjusting ring 64 causes the surface of the ring acted on by the stored-energy device 20 to change its axial height from the pressure plate 18. The pretensioning spring 66 which may, for example, comprise a helical tension spring urges the adjusting ring 64 in rotational movement around the axis of rotation A with respect to the pressure plate 18 in a direction such that the surface acted on by the stored-energy device 20 moves away from the pressure plate 18 upon release of the adjusting ring 64. For this purpose, one end of the pretensioning spring 66 is held in place on the pressure plate 18 and the other end of the pretensioning spring 66 is held on the adjusting ring 64.

The wear-compensating device 26 also includes a wedge-like slider 68 which has a curvature that conforms to the curved contour of the adjusting ring 64. A longitudinal section 70 of the slider 68 rests against an inner circumferential area of an axial shoulder 72 on the pressure plate 18. The slider 68 is designed to slide in the circumferential direction. One end of a leaf-like arresting element 76 is fixed in place at one end on the pressure plate 18. The other circumferential end area 79 of the arresting element 76 extends over the wedge-like elongated area 70 of the wedge-like slider 68. Accordingly, the arresting element 76 presses on the slider 68 and thus pushes it against the pressure plate 18. One end of another pretensioning spring 80 is hooked onto a hook section 78 of the slider 68. The other end of the pretensioning spring 80 is hooked onto the end of the spring 66 that is hooked onto the adjusting ring 64. The pretensioning spring 80 urges the slider 68 to slide in a circumferential direction which causes the increasingly larger axial dimension of the slider to fill up the area between the pressure plate 18 and the end area 79 of the arresting element 76. However, the end area 79 of the arresting element 76 which is pretensioned against the pressure plate 18 prevents the slider 68 from executing this type of sliding movement in the circumferential direction.

Figure 4:
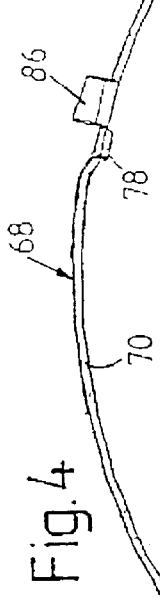
FIG. 4 is a top view of the slider shown in FIG. 3.

As shown in FIG. 4, the slider 70 has a blocking section 86 which is bent radially outward so that the blocking section 86 extends radially outward to engage in an associated circumferential opening in the adjusting ring 64. The circumferential opening, which cannot be seen in the drawings, has a larger circumferential dimension than the blocking section 86. Accordingly, the blocking section 86 has a certain limited freedom to move circumferentially in this circumferential opening of the adjusting ring 64.

A stop element 82 is arranged on the housing 14 and is radially inside the adjusting ring 64 and near the end area 79 of the arresting element 76. The stop 82 may comprise a threaded bolt which threadably inserted into a corresponding threaded hole in the housing 14 and a mushroom-like head 84 which projects into the space formed between the arresting element 76 and the pressure plate 18.

The operation of the wear-compensating device 26 upon the occurrence of wear, that is, upon abrasion of the friction linings 38, 40, is described below.

The friction linings 38, 40 of the friction clutch 10 are subjected to heavy stress during the execution of clutch-engaging operations, thereby causing abrasion or wear of the friction linings 38, 40. The intermediate plate 32 and the pressure plate 18 are moved closer to the flywheel 16 as a result of the wear of the friction linings. The stored-energy device 20 basically follows the movement of the intermediate plate 32 and the pressure plate 18 by changing its installation position correspondingly when in the engaged state. Once the wear of the friction linings 38, 40 reaches a certain extent, the end area 79 of the arresting element 76 contacts the mushroom-shaped head 84 of the stop element 82. As further wear occurs, the pressure plate 18 continues to move toward the flywheel 16 while the end area 79 of the arresting element 76 remains hanging on the stop element 82. That is, the end area 79 of the arresting element 76 no longer follows along after the displacement of the pressure plate 18. The intermediate space formed between the arresting element 76 and the pressure plate 18 and filled up by the wedge-like section 70 of the slider 68 increases. The enlargement of this space allows the slider 68 to move slightly in the circumferential direction under the urgency of the spring 80. The displacement of the slider 68 in the circumferential direction corresponds to the amount of wear. This displacement of the slider 68 in the circumferential direction is possible because the blocking section 86 has a certain circumferential play in the previously mentioned opening in the adjusting ring 64. Upon the occurrence of wear, only a certain part of the arresting element 76 will be able to move axially with respect to the pressure plate 18 while the end area 79 is prevented from following the pressure plate 18 by the head 84 of the stop element. The slider 68 will also move to a certain extent in the circumferential direction allowed by the end area 79 of the arresting element 76. The pretensioning spring 80 thus relaxes slightly upon movement of the slider 68 in response to wear. In the engaged state of the friction clutch 10, the adjusting ring 64 is acted on by the stored-energy device 20 which prevents the ring from rotating circumferentially with respect to the pressure plate 18. The adjusting ring 64 is moved under the urgency of the pretensioning spring 66 only upon the performance of a release operation, i.e., after a release of the force of the stored-energy device 20 on the adjusting ring 64 in response to the above-mentioned pulling action. The adjusting ring 64 is moved only until the blocking section 86 contacts one of the ends of the circumferential opening in the adjusting ring 64. The contact force of the adjusting ring 64 on the stored-energy device 20 is defined essentially only by the previously mentioned tangential leaf springs, which also provide the release force. Since the circumferential movement of the slider 68 already corresponds with the wear which has occurred, the rotational movement of the adjusting ring 64 upon execution of a release operation also corresponds to the wear which has occurred. Upon this rotational movement of the adjusting spring 64, the pretensioning spring 66 relaxes slightly and the pretensioning spring 80 is tensioned again somewhat more strongly. Accordingly, the pretensioning force applied by the spring 66 is required to be greater than the pretensioning force applied by the spring 80.

As a result of the rotation of the adjusting ring 64 in the disengaged state upon the occurrence of wear, the surface of the adjusting ring 64 facing the stored-energy device 20 is displaced axially with respect to the pressure plate 18. Accordingly, the entire assembly clamped axially between the stored-energy device 20 and the flywheel 16, which includes the adjusting ring 64, the pressure plate 18, the clutch disk 34 in the area of its friction linings 38, the intermediate plate 32, and the clutch disk 36 in the area of its friction linings 40, thus retains an approximately constant axial dimension regardless of the amount of wear which has occurred. As a result, the stored-energy device 20 also retains approximately the same installed position. The degree of inclination of the elongated, wedge-like area 70 of the slider 68, for example, dictates the degree of compensation. Furthermore, several sliders 68 and their associated arresting elements 76 or stop elements 82 may be distributed around the circumference of the friction clutch 10. However, to implement the previously described wear compensation, a single such slider 68 is sufficient.

A set of external teeth 156 are arranged on an outer circumferential area of the hub 42 which has a radial shoulder 158. The internal circumferential areas of the clutch disks 34, 36, such as in the area of the associated cover disk elements 50, 52, have internal teeth which engage with the external teeth 156. The cover disk element 50 of the clutch disk 36 is supported axially on the shoulder 158. A first disk element 160 is supported on a radially projecting area 162 of the hub 42 on the other axial side of the clutch disk 36. A second disk element 164 is supported axially on the clutch disk 36 such as, for example, on an associated rivet connecting the cover disk elements 50, 52. A pretensioning element 166 designed, for example, as a cup spring may be arranged between the first and second disk elements 160, 164 for pretensioning the clutch disk 36 against the shoulder 158 of the external teeth 156. An essentially tight connection is thus formed in the axial direction between the clutch disk 36 and hub 42. At the other axial end, the hub 42 has a ring-shaped groove 168, which is open toward the radially outer side. In the state shown in FIG. 5, a latching ring 170 is partially seated in the ring-shaped groove 168. The part of the latching ring which projects radially outward of the ring-shaped groove 168 thus forms a motion stop for the clutch disk 34.

Figure 6:
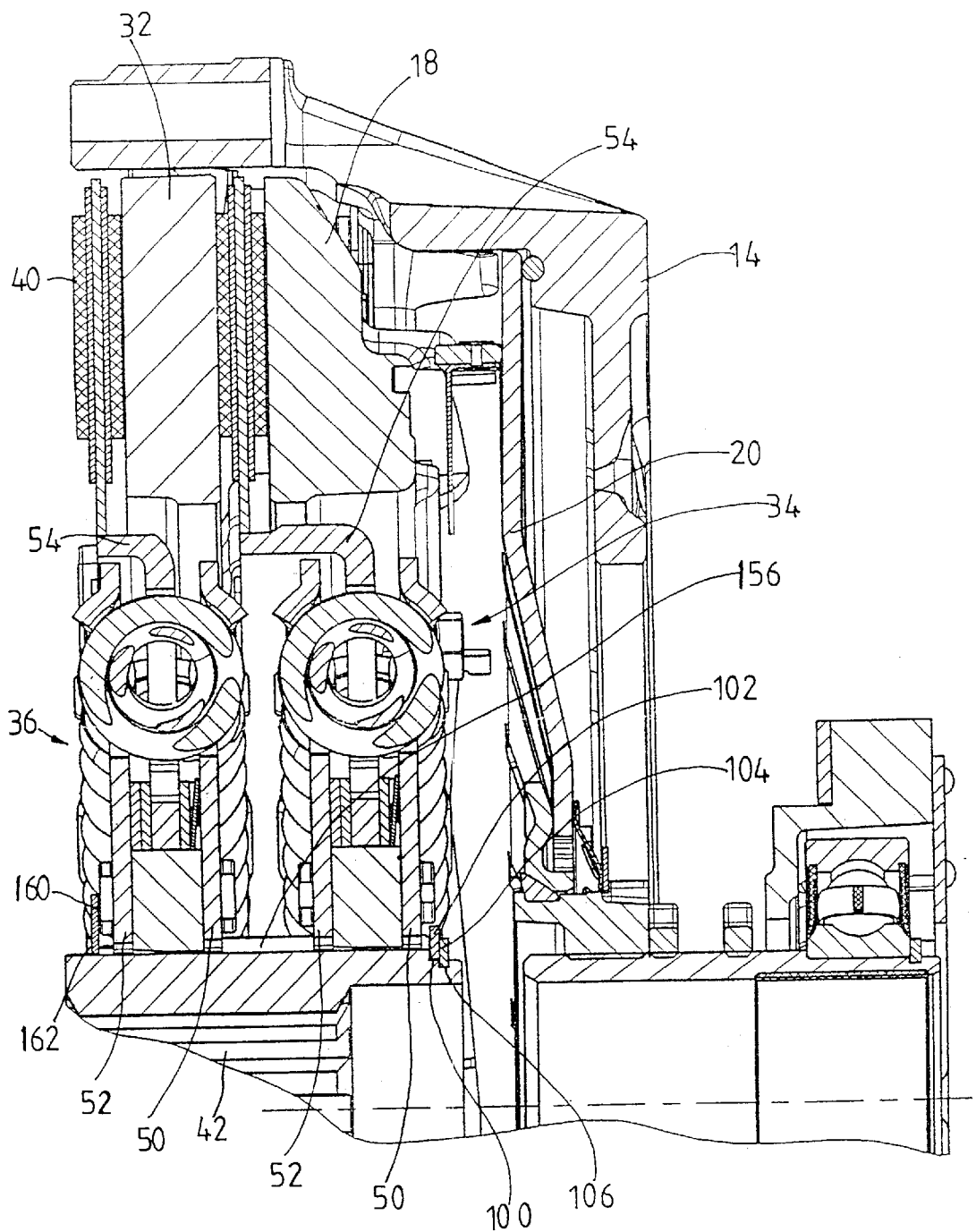
FIG. 6 is a partial longitudinal sectional view of a pressure plate assembly showing an alternative method for connecting a clutch disk to a hub for transport.

An alternative method for axially connecting the clutch disk 34 to the hub 42 is shown in FIG. 6 and includes an axial locking ring 102 is supported on a radial shoulder 100 at the axial end of the hub 42 facing the housing 14. The clutch disk 34 may then be supported axially on the ring 102. A locking ring or spring ring 104 is provided in a circumferential groove 106 to secure the ring 102 axially on the hub 42. The spring ring 104 and the ring 102 may be installed after the two clutch disks 34, 36 have been inserted into the housing 14 along with the intermediate plate 32 and the hub 42. That is, the two rings may be passed through the central opening of the housing 14, in which the clutch-release mechanism is otherwise installed. The spring ring 104 and the ring 102 may be installed and even removed through the central opening because the spring ring 104 is not radially overlapped by any of the components of the clutch disk 34, such as by the rivets.

Otherwise, the design of the clutch or pressure plate assembly shown in FIG. 6 is the same as that previously described.

As described below in further detail, the motion-stopping action of the latching ring 170 and the rings 102, 104 ensures that the unit formed by the clutch disk 36 and the hub 42 is held tightly to the clutch disk 34 and thus tightly to the pressure plate assembly 12.

In the pressure plate assembly 12 described above with reference to FIGS. 1–4, the pressure plate 18 and/or the intermediate plate 32 must be prevented from shifting position unallowably with respect to the housing 14 in the transport state under the effect of the urgency of the stored-energy device 20 before the assembly is attached to the flywheel 16. A shift of this kind could activate the wear-compensating device 26 and effect an unnecessary wear-compensating adjustment. To prevent this type of inadvertent wear-compensating adjustment, a transport-securing arrangement 172 is provided according to the present invention including a plurality of threaded bolts 174, each of which passes through an opening 176 in the outer circumferential area of the housing 14. Each of these bolts 174 has an externally threaded portion 178, which is screwed into internally threaded holes 180 in the intermediate plate 32. Spacer sleeves 184 are arranged between the heads 182 of the threaded bolts 174 and the housing 14. The spacer sleeves 184 may, for example, be plastic sleeves which surround the shaft area of the threaded bolts 174. The spacer sleeves 184 ensure that the fastening bolts 174 screwed into the intermediate plate 32 do not project out axially so far as to prevent the pressure plate assembly 12 from being guided toward the flywheel 16 and brought into final position for attachment to the flywheel 16.

The transport-securing arrangement 172 also includes the previously discussed latching ring 170. After the intermediate plate 32 has been tightly connected by the threaded bolts 174 to the housing 14, the latching ring 170 ensures that the unit formed by the clutch disk 36 and the hub 42 is also tightly secured to the pressure plate assembly 12. The recommended procedure is to first introduce the fastening bolts 174 and then bring the above-mentioned unit formed by the clutch disk 36 and the hub 42 axially toward the clutch disk 34 in the state in which the clutch disk 34 is clamped tightly between the pressure plate 18 and the intermediate plate 32. The latching ring 170 is thus compressed, so that it becomes completely seated in the ring-shaped groove 168, which allows the hub 42 to be pushed into the inner circumferential area of the clutch disk 34. After the hub 42 has been introduced far enough into the clutch disk 34, the end of the hub 42 where the latching ring 170 is positioned emerges again from the side of the clutch disk 34 next to the housing 14. Because of its springiness, the latching ring 170 now moves radially outward and into the position shown in FIG. 5, where it contacts the clutch disk 34. In this state, the latching ring 170 grips behind the clutch disk 34 and thus prevents the hub 42 and the clutch disk 36 attached tightly to it from falling off the clutch disk 34. In the state shown in FIG. 5, at least a slight amount of axial play between the radially inner area of the clutch disk 34 and the latching ring 170 is required to prevent the intermediate plate 32 from being tightly clamped between the friction linings 38, 40 of the clutch disks 34, 36 in the released state during the following operation of the clutch.

Figure 5:
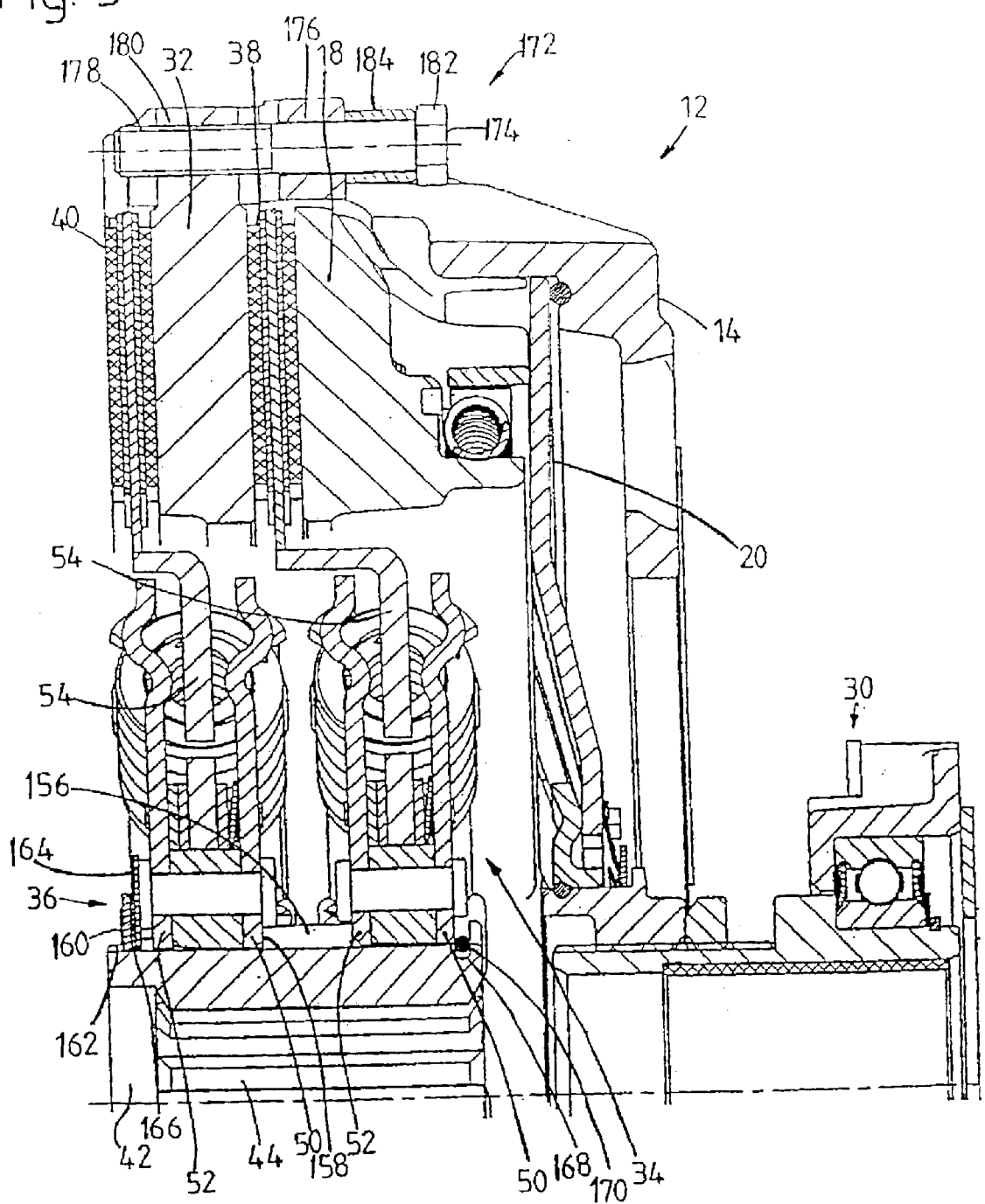
FIG. 5 is a partial longitudinal sectional view through a pressure plate assembly according to the present invention in a secured-for-transport state.

When the pressure plate assembly 12 shown in FIG. 5 is to be attached to the flywheel, the pressure assembly 12 is brought up to the flywheel 16 so that through-openings 90 in the housing 14 (see FIG. 1) are positioned in alignment with corresponding internally threaded holes in the flywheel 16. Before the threaded bolts 174 are removed, additional threaded bolts are passed through the holes 90 and screwed into the flywheel 16 to obtain a preliminary fixation of the pressure plate assembly 12 to the flywheel 16. The threaded bolts 174 shown in FIG. 5 may then removed. The spacer sleeves 184 are removed from the threaded bolts 174, and the threaded bolts 174 may then be introduced into additonal holes 90 and screwed into the flywheel 16. The threaded bolts 174, which are in themselves somewhat too long to provide the previously mentioned transport-securing function without the spacer sleeves 184, are therefore also used to attach the pressure plate assembly 12 to the flywheel 16. As soon as the threaded bolts 174 are removed from the position shown in FIG. 5, the transport-securing function of the transport-securing arrangement 172 is completely released. Accordingly, no further measures such as releasing a securing device of some type are required to make the clutch functional. As soon as the threaded bolts 174 are removed, the axial mobility of the intermediate plate 32 with respect to the housing 14 required for operation is restored.

The present invention allows a secured-for-transport state to be obtained in which the elements securing the assembly for transport may also be used to attach the pressure plate assembly to a flywheel. Also when removal of the pressure plate assembly from the flywheel is required, the fastening screws may be brought again into the state shown in FIG. 5 to produce the secured-for-transport state before the complete removal of the pressure plate assembly. Different types of elements such as, for example, clamping elements introduced radially from the outside or the like could also be used to connect the housing tightly to the intermediate plate.

An especially advantageous aspect of the present invention is that the second clutch disk of a multi-disk clutch may also be held on the pressure plate assembly by the common hub and the motion stops acting at both axial ends of the hub. In this way, the two clutch disks, the hub, and the intermediate plate may be combined to form a unit which may be handled and transported by itself.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A transport-securing arrangement in a pressure plate assembly of a multi-disk clutch, wherein said pressure plate assembly comprises:

a housing arrangement adapted to be connected to a flywheel;

a pressure plate connected to said housing arrangement such that said pressure plate is fixed with respect to rotation relative to said housing arrangement and axially movable relative thereto;

a stored-energy device having one side supported on said housing arrangement and another side supported on the pressure plate arrangement;

an intermediate plate connected to said housing arrangement such that said intermediate plate is fixed with respect to rotation relative to said housing arrangement and axially movable relative thereto; and a first clutch disk having a friction surface area positioned between said pressure plate and said intermediate plate, and wherein said transport-securing arrangement comprises a plurality of connecting elements for connecting said intermediate plate to said housing arrangement in a secured-for-transport state and for preventing axial movement of said intermediate plate relative to said housing arrangement in the secured-for-transport state.

2. The transport-securing arrangement of claim 1, wherein said connecting elements are positioned in an outer circumferential area of said housing arrangement and distributed in a circumferential direction in the secured-for-transport state.

3. The transport-securing arrangement of claim 1, wherein said connecting elements allow the pressure plate assembly to be positioned on and attached to the flywheel in the secured-for-transport state.

4. The transport-securing arrangement of claim 1, wherein said connecting elements comprise bolt elements which pass through holes in said housing arrangement in the secured-for-transport state, said bolt elements comprising an externally threaded portion and said intermediate plate comprises an internally threaded portion in which said externally threaded portions of said bolts are screwed, said transport-securing arrangement further comprising spacer elements on which said bolt elements are supported on the housing arrangement.

5. The transport-securing arrangement of claim 4, wherein said spacer elements are spacer sleeves, and wherein said bolt elements comprise heads supported on said spacer sleeves.

6. The transport-securing arrangement of claim 1, wherein said housing arrangement is connectable to the flywheel using fastening elements and at least some of said connecting elements are usable as the fastening elements for connecting said housing arrangement to the flywheel.

7. The transport-securing arrangement of claims 1, wherein said pressure plate assembly further comprises a second clutch disk with a friction surface area in a position following said intermediate plate, and a common hub connecting said second clutch disk to said first clutch disk.

8. The transport-securing arrangement of claim 7, wherein said common hub comprises an external teeth configuration and each of said first and second clutch disks comprise internal teeth configurations which engage with said external teeth configuration of said common hub.

9. The transport-securing arrangement of claim 8, wherein said common hub comprises two axial ends and said transport-securing arrangement further comprises motion stops for the first and the second clutch disk respectively arranged at said two axial ends of said common hub.

10. The transport-securing arrangement of claim 9, wherein one of said motion stops cooperates with said first clutch disk and comprises a latching element which arrives in a stopping position after said common hub with said external teeth configuration is introduced into said internal teeth configuration of said first clutch disk.

11. The transport-securing arrangement of claim 10, wherein said latching element comprises a latching ring pretensioned in a radially outward direction relative to said common hub.

12. The transport-securing arrangement of claim 9, further comprising a pretensioning element arranged on said common hub in an area of one of said motion stops cooperating with said second clutch disk, said pretensioning element pretensioning said second clutch disk against an opposing support area of said common hub.

13. The transport-securing arrangement of claim 10, further comprising a pretensioning element arranged on said common hub in an area of the other one of said motion stops cooperating with said second clutch disk, said pretensioning element pretensioning said second clutch disk against an opposing support area of said common hub.

14. The transport-securing arrangement of claim 12, wherein said external teeth configuration of said common hub defines said opposing support area.

15. The transport-securing arrangement of claim 13, wherein said external teeth configuration of said common hub defines said opposing support area.

16. The transport-securing arrangement of claim 1, wherein said friction surface area of said first clutch disk is held between said pressure plate and said intermediate plate after the secured-for-transport state has been produced.

* * * * *